Figure 1:
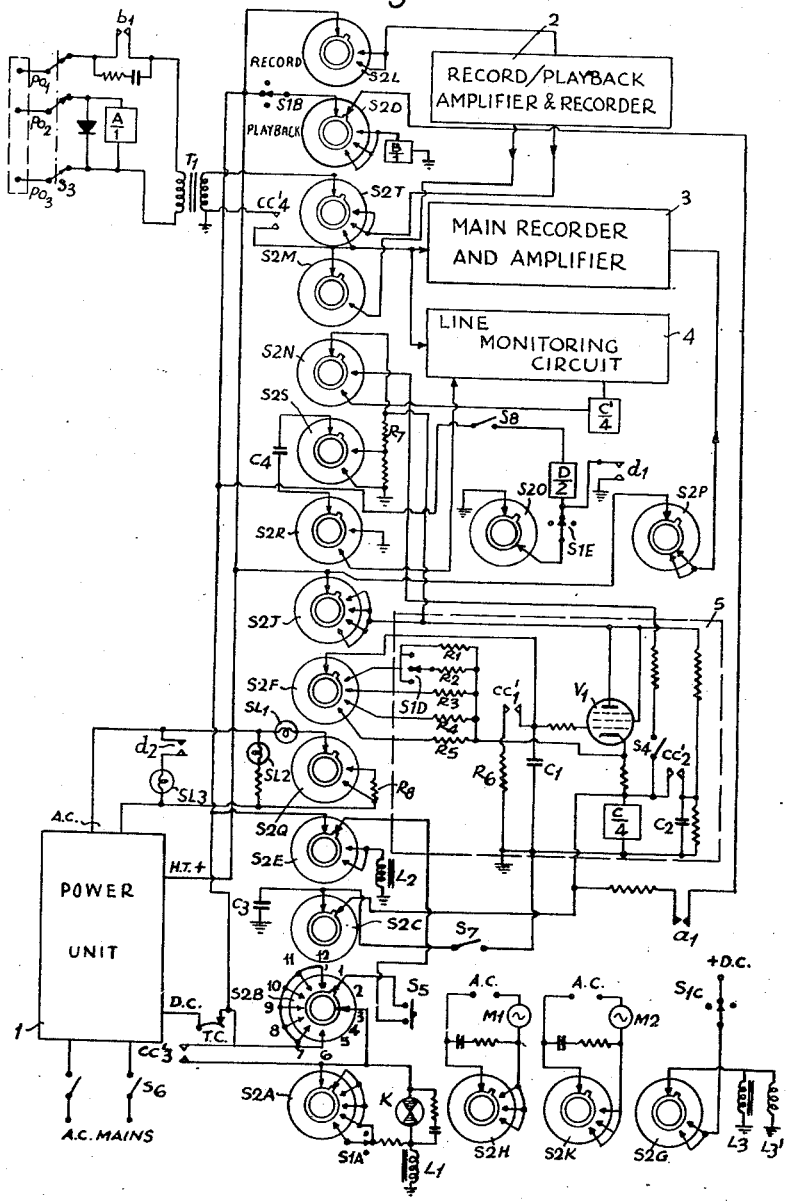

Dec. 3, 1957   M. T. O'DWYER   2,815,401
TELEPHONE ANSWERING MACHINE
Filed Nov. 28, 1955   4 Sheets-Sheet 2

Inventor
Martin T. O'Dwyer
By
Holcomb Wetherill & Brisebois
Attorneys

Dec. 3, 1957   M. T. O'DWYER   2,815,401
TELEPHONE ANSWERING MACHINE
Filed Nov. 28, 1955   4 Sheets-Sheet 3

Inventor
Martin T. O'Dwyer
By
Attorneys

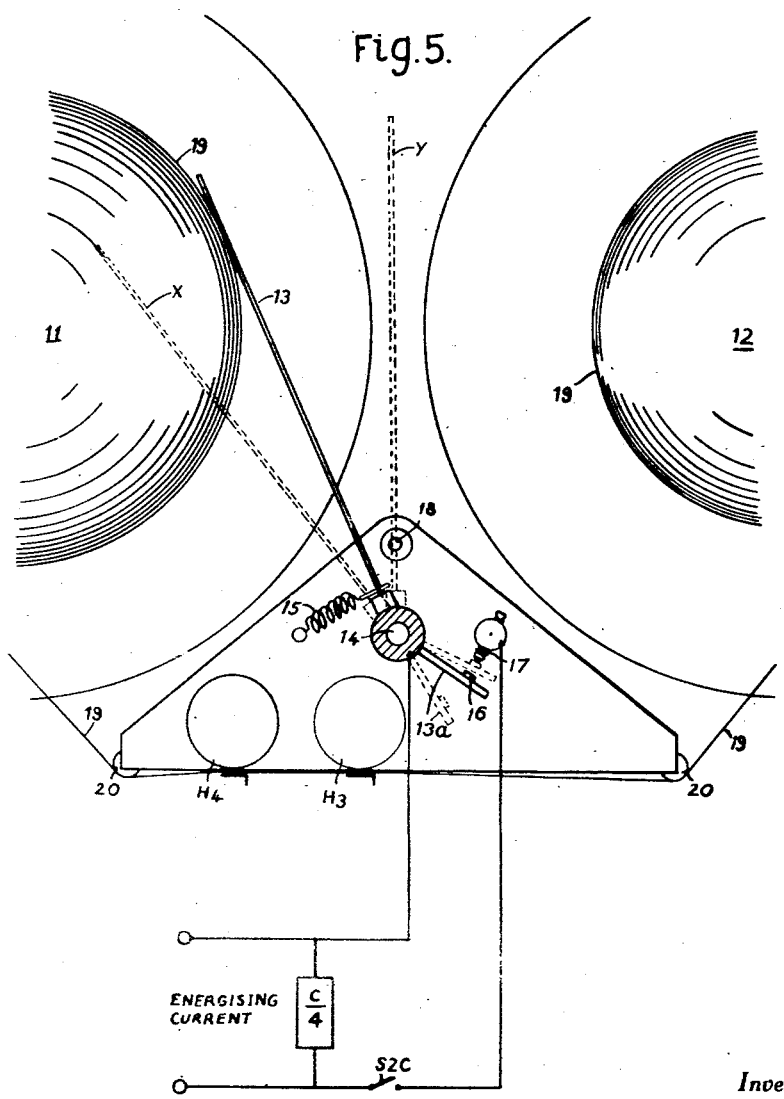

United States Patent Office 2,815,401
Patented Dec. 3, 1957

2,815,401

TELEPHONE ANSWERING MACHINE

Martin T. O'Dwyer, Cambridge, England, assignor to Pye Limited, Cambridge, England, a British company Application November 28, 1955, Serial No. 549,526

Claims priority, application Great Britain December 6, 1954

9 Claims. (Cl. 179—6)

The present invention relates to switching arrangements and more particularly to switching arrangements adapted to control a sequence of operations, for example in a telephone answering machine.

According to one aspect, the invention provides a switching arrangement for controlling a sequence of operations, comprising a stepping switch having a plurality of switch positions in which the completion of an operation of the sequence actuates the stepping switch to another position where it conditions a circuit or circuits associated with the next operation of the sequence and in which a delay circuit is provided, which if the stepping switch is not actuated on completion of an operation of the sequence, actuates the switch after a certain time delay to switch it to the next position. The time delay produced by the delay circuit is arranged to be longer than the time normally taken to carry out the operation with which the time delay is associated.

According to a feature of the invention, the delay circuit can operate in each of the positions of the stepping switch which controls an operation of the sequence. Alternately the delay circuit may only operate in certain positions of the stepping switch that is to say the delay circuit is only able to become effective if certain operations of the sequence are not completed to actuate the stepping switch. According to a further feature of the invention, after the completion of the final operation of the sequence the delay circuit may operate, if desired after a predetermined time delay, to return the stepping switch to its starting position.

According to another feature of the invention the stepping switch is arranged to adjust the time period of the delay circuit in different positions of the stepping switch in order that the time delay in any position is always longer by a desired amount than the time taken for the operation to be carried out in that position.

The delay circuit preferably comprises an electronic valve circuit with an associated resistor and condenser network having a time constant giving the desired time delay. Several resistors or condensers may be provided which can be switched to give different time constants representing different time intervals. The cricuit may be arranged such that after a time interval has elapsed depending upon the chosen time constant, the valve becomes conducting and passes current to energise a relay or the like controlling the operation of the stepping switch.

The switching arrangement according to the present invention may be particularly employed in telephone answering machines of the kind which are intended to answer the telephone automatically on receipt of a call and which reproduce a recorded message to the caller and also invite the caller to record a message on a recording device. Such machines may be controlled sequentially on receipt of a call to reproduce the recorded message to the caller, invite the caller to record a message, and then set the message recording device in operation, and finally to disconnect the machine from the telephone line at the termination of the call.

It is desirable that if such a telephone answering machine does not perform any of its operations correctly, it shall be sequentially switched to successive positions after adequate time delays and eventually disconnected from or clear the telephone lines.

From another aspect therefore the invention provides a telephone answering machine which answers a telephone automatically and which reproduces a recorded message to a caller and also invites the caller to record a message on a recording device, wherein the sequence of operations performed by the machine is controlled by an electrically-operated stepping switch having a plurality of switch positions, said switch being operated on the completion of one of the operations to step to another position in which it conditions a circuit or circuits associated with the next operation of the sequence and in which a delay circuit is provided which, if the stepping switch is not actuated on completion of any operation of the sequence, actuates the switch after a certain time delay to switch the machine to the next position.

According to yet a further feature of the invention, means are provided which automatically render the telephone answering machine inoperative to answer further calls if a fault develops in the machine during its operation to answer a call. Such means may comprise a thermal cut-out controlling the power supply to the stepping switch.

Figure 2:
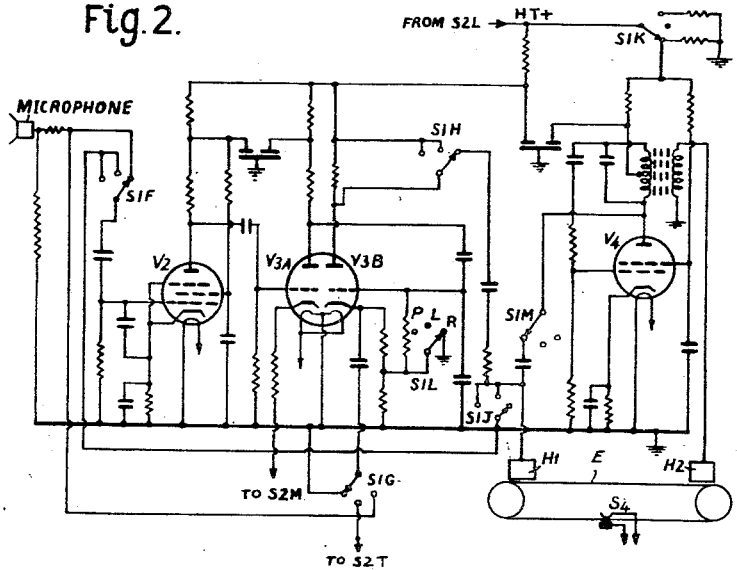
Figure 3:
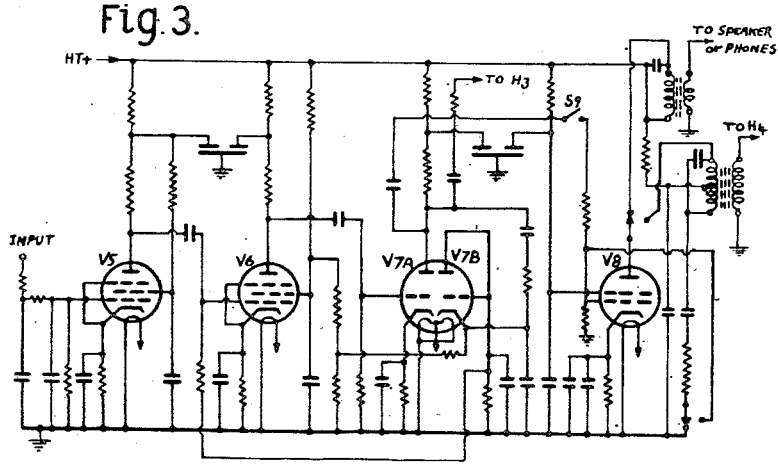
Figure 4:
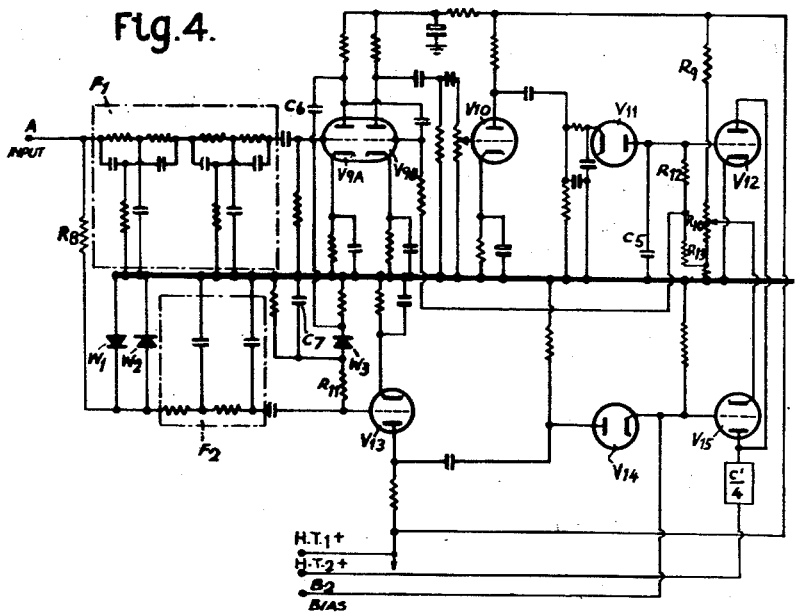

In order that the invention may be more fully understood, reference will now be made to the accompanying drawings which illustrate a telephone answering machine incorporating a switching arrangement according to the invention, and in which:

Figure 1 is a block circuit diagram of the machine,
Figure 2 is a circuit diagram of the record-playback amplifier and recorder,
Figure 3 is a circuit diagram of the main amplifier,
Figure 4 is a circuit diagram of the line monitor circuit, and
Figure 5 is a diagram of part of the main recorder.

Referring to Figure 1, the machine comprises a power unit 1, which supplies appropriate power supplies to a record-playback amplifier 2, a main recorder and amplifier 3, a line monitor circuit 4, and a delay circuit enclosed within the broken line rectangle 5. The machine also comprises a stepping switch S2 consisting of a plurality of switch wafers S2A to S2T. The switch S2 is shown as a 12-position rotary switch which is stepped round by the stepping solenoid L1 and main contactor K operated from a low voltage D. C. power supply also derived from the power unit 1 through the thermal cut-out T. C. The various wafers of the stepping switch S2 are arranged to connect the appropriate power supplies to the different units of the telephone answering machine and carry out other switching functions as the machine performs a sequence of operations in answer to a received call, as will be more fully hereinafter explained.

The record-playback amplifier 2 described later with reference to Figure 2, is arranged to provide facilities for recording a message to be reproduced to a caller, for example on an endless magnetic tape record and to reproduce the message to the caller at the appropriate time. The tape recorder in the unit 2 is driven by the motor M1. L2 is the tape drive or capstan solenoid for driving the magnetic tape in the unit 2.

The main recorder and amplifier 3 described later with reference to Figures 3 and 5, is provided for sequentially recording messages dictated by callers and to reproduce the message to the called subscriber when required. The messages are recorded on a tape recorder which is driven by the motor M2. L3 is the tape drive or capstan solenoid for driving the magnetic tape in the unit 3, and L3' is the brake solenoid.

The line monitor circuit 4, described later with reference to Figure 4, controls the energising coil C'/4 of a double coil relay which actuates the stepping switch S2 through the contact cc'3 to switch off the telephone answering machine substantially immediately after the termination of a call, whether it originates from an automatic exchange or a manual telephone exchange or is a trunk call. This line monitor circuit comprises two parallel channels, one of which responds to dialling tone to operate relay coil C'/4 and the other of which responds to speech signals and operates relay coil C'/4 in the absence of speech signals. The circuit forms the subject of our co-pending application Ser. No. 549,422 of even date.

The delay circuit 5 comprises a valve V1 having its cathode connected in series with the other energising coil C/4 of the double coil relay which actuates the stepping switch S2 through the contact cc'3, the arrangement being such that when valve V1 conducts the coil C/4 is energised. The conductance of the valve V1 is controlled by the time constant circuit comprising condenser C1 and a resistor or resistors selected from the parallel resistor network R1, R2, R3, R4 or R5 by means of switching S2F and S1D. When the relay coil C/4 is energized condenser C1 discharges through resistor R6 via contacts cc'1, and in addition contacts cc'2 close to discharge condenser C2 across the coil and lengthen the period of closure of the contacts. This delay circuit also functions to switch off the telephone answering machine by returning S2 to its home position (position 1) after a given time period, for example after a caller has had the allowed time to record a message, or if the machine breaks down.

The machine is connected to the telephone lines PO1, PO3 through the line isolation switch S3, and is connected in parallel with the telephone instrument fed by the lines PO1, and PO3. Ringing current and speech currents are received over lines PO1 and PO3. The telephone bell circuit is connected in series with relay coil A/1 through the line PO2. The machine is completely isolated from the telephone lines by the line isolating transformer T1 connected across lines PO1 and PO3. The A. C. mains are fed to the power unit 1 through the double pole mains switch S6.

Switch banks S1A, S1B, S1C, S1D and S1E form part of a system switch determining whether the machine is conditioned to record, playback (reproduce) or is connected to the telephone line to answer a caller. The contacts are shown in the position in which the machine is connected to the telephone lines to answer a caller. This switch also comprises other contact banks which switch circuits in the record-playback unit 2 and in other parts of the apparatus.

Assuming that a message is already recorded on the endless magnetic tape in the unit 2, informing a caller that the called subscriber is not available and inviting the caller to dictate a message, the operation of the machine to answer an incoming telephone call will now be explained. The main switch S6 is closed, switching on the power unit and lighting the indicator lamp SL2 connected across the low voltage A. C. output from the power unit 1. The lines isolation switch S3 is also in the position shown connecting the machine to the telephone lines PO1, PO2 and PO3. The selector switch S2 is in position 1 which is the home position.

When a ringing current is received over lines PO2, PO3, relay A/1 is operated closing contact a1. This allows the energisation of relay C/4 via S2D, closing contacts cc'3 to actuate the stepping solenoid L1 and S2 moves to position 2. The energisation of relay C/4 is delayed for a short period until condenser C3 connected across the relay via S2C, is charged, which ensures that the telephone must ring properly two or three times before the machine operates and thereby avoids operation on a short spurious pulse of ringing current.

*S2 position 2.*—In this position motor M1, is energised via S2R and H. T. from the power unit 1, is applied to the delay circuit 5 via S2J. After approximately 10 seconds' delay, provided to enable the called subscriber to answer the telephone if present, and produced by the time constant circuit C1, R1, valve V1 conducts and C/4 operates closing contacts cc'1, cc'2, and cc'3. Contacts cc'1 discharge the delay condenser C1 through resistor R6, cc'2 discharge condenser C2 across the coil C/4 to lengthen the period of closure of the relay contacts, and cc'3 energises stepping solenoid L1 which rotates S2 to position 3.

*S2 position 3.*—In this position relay B/1 is energised via S2D closing contact b1 and connecting transformer T1 across the speech lines PO1 and PO3. The capstan motor M2 in the main recorder and amplifier unit 3 is also energised through S2K. H. T. is now applied to the record-playback amplifier 2 via S2L, and at the same time the endless tape driving solenoid L2 is energised via S2E and the prerecorded message is played back to the caller from the unit 2 via S2T and transformer T1. The endless tape runs for a predetermined time, for example 40 seconds, until a tape-actuated contact S4 is closed in the delay circuit 5 which energises coil C/4 via S2N and thereby energises stepping solenoid L1 and S2 moves to position 4. If S4 should fail to operate the delay circuit comprising R3 and C1 operates after 1 minute to energise C/4 and so move S2 to position 4. In addition, in position 3, condenser C4 is charged from H. T.+ via R7, S2S and S2R.

*S2 position 4.*—The capstan solenoid L3 and brake solenoid L3' in the main recorder unit 3 are energised via S2G thus starting to drive the recording tape, and H. T. is applied to the main recorder and amplifier 3 via S2P. After approximately 2 seconds' delay produced by condenser C1 and resistor R4 in the delay circuit (during which time the instruction "please speak now" is played back to the caller from the endless tape and also recorded on the tape in the main recorder unit 3) C/4 is energised and S2 moves to position 5. In position 4, the instruction "please speak now" is also applied from the output of the record-playback amplifier 2, through S2M to the input of the line monitor circuit 4 as a bias to prevent coil C'/4 being energised immediately H. T. is applied to the line monitor circuit 4, when position 5 of S2 is reached later, and before a caller has begun to speak. If C'/4 was allowed to operate, the switch S2 would lock in position 5. At the same time, relay D/2 is energised from the D. C. supply through S2O and S1E thereby closing contact d2 and lighting lamp SL3 which indicates that a call has been received. Contact d1 holds in relay D/2 until a further switch S8 located in the recorder unit 3 is moved to the reproduce position.

*S2 position 5.*—In this position H. T. is applied to the line monitor circuit 4 via S2N and relay coil C'/4 and the connections to the condenser C4 are reversed by S2S and S2R, so that a negative voltage is applied to the channel responding to dialling tone in the line monitor circuit for approximately 5 seconds thus preventing it from operating on switching pulses, and also preventing C'/4 from remaining closed if dialling tone is immediately received in position 5 due to the caller having hung-up or having been disconnected. (If C'/4 remained closed the stepping switch S2 would lock in position 5.) Whilst the caller is speaking the line monitor circuit 4 monitors the speech signals which are rectified in the speech operated channel and employed as a bias to prevent current passing through coil C'/4.

When the caller has finished speaking the line monitor circuit 4 allows coil C'/4 to be energised and switch S2 is homed to position 1 via S2B. Switch positions 6 to 12 are not employed to control any operation of the machine in this embodiment. By reason of the line monitor circuit, the machine may operate on both manual and auto exchanges, and on trunk calls when dialling tone may not be immediately received at the end of the call.

If by reason of any fault in the equipment, such as a breaking of the endless tape, or a fault in the amplifier of the unit 2, the words "Please speak now" are not applied to the monitor unit 4 in position 4 of S2, relay C'/4 will be energised immediately position 5 of S2 is reached and will stay energised so maintaining a heavy current through the stepping solenoid L1 of S2. This in turn causes the thermal cut-out T. C. to break after approximately 20 seconds thereby rendering S2 inoperative and disconnecting the machine from the telephone lines, since relay B/1 is also de-energised opening contacts b1. The machine cannot then operate to answer further calls until the thermal cut-out is restored.

Whilst S2 is moving from position 4 to position 5, contact cc'4 momentarily shorts the input line via S2T. This ensures that if a fault has developed in unit 2, but the caller has commenced speaking before position 5 is reached, or has already rung off so that dialling tone is present which may break through the speech channel of the line monitor circuit 4; then these signals will be shorted thereby allowing relay C'/4 to operate as above, and avoiding the risk of these signals preventing C'/4 from operating to break the thermal cut-out. Contact cc'4 remains closed, if a fault is present, until the thermal cut-out T. C. operates The operation of the machine when recording a message on the endless tape in the unit 2 is as follows:

*S2 position 1.*—The system switch is switched to the "record" position and a microphone is connected to the unit 2 ready to dictate a message on to the endless tape. When the push-button switch S5 is depressed, the stepping switch solenoid L1 is energised via S2B and S2 moves to position 2.

*S2 position 2.*—In this position motor M1 is energised via S2H, and H. T. is applied to the delay circuit 5 via S2J. After 1 second delay produced by time constant circuit C1, and R1 and R2 in parallel (since S1D is now closed) C/4 operates, closing contacts cc'1, cc'2 and cc'3. Contacts cc'1, discharges the delay condenser C1 through R6, cc'2 discharge condenser C2 across coil C/4 to lengthen the period of closure of the relay contacts, and cc'3 energizes stepping solenoid L1 which rotates S2 to position 3.

*S2 position 3.*—H. T. is now applied to the record-playback unit 2 via S2L. Relay B/1 is not energized since switch S1B is now open, and hence the line is not connected to the equipment. Lamp SL1 is lit at reduced brilliance through S2Q and R8. At the same time the endless tape driving solenoid L2 is energised and the message may then be recorded. The endless tape runs for a predetermined period until the tape-operated contact S4 is closed to energise C/4 when S2 moves to position 4. If S4 should fail to operate the delay circuit 5 comes into operation after 1 minute due to the time constant of R1, C3 and S2 moves to position 4.

*S2 position 4.*—In this position the brilliance of the lamp SL1 is increased due to cutting out the resistance R8, and indicates when the instruction "Please speak now" should be recorded. After approximately 2 seconds given by the time constant C1, R4 in the delay circuit, S2 homes to position 1 via S2B.

In order to monitor a message recorded on the endless tape in the unit 2, the machine is operated in a similar manner to that just described for the recording of a message on the endless tape, except that the system switch is switched to the "playback" position and means are provided for re-producing the message recorded on the endless tape. The sequence of operations is again initiated by pressing the push-button switch S5. After the recorded message has been reproduced followed by the instruction "Please speak now," the switch S2 homes to position 1 via S2B.

Interlocks may be provided between the record-playback amplifier unit 2 and the main recorder and amplifier 3 so that the telephone answering machine is rendered inoperative to answer a telephone call whilst a message from a caller is being reproduced from the tape in the unit 3 or whilst the tape is being rewound. It will also be noted that if any of the mains supply, the high tension supply or the D. C. supply should fail whilst the machine is connected to the telephone line, relay B/1 will no longer be energised through switch S2D and the input transformer T1 is thereby disconnected from the telephone lines since contact b1 is open. This occurs for a failure in the H. T. supply because although the relay B/1 is energised from the D. C. supply, this latter supply is fed through switch S2D in positions 3, 4 and 5 and the latter switch is moved to these positions by the delay circuit 5 energized form the H. T. supply.

A switch S7 is arranged in parallel with the coil of the relay C/4 and in series with S2C and is closed to short-circuit relay C/4 when S2C is in position 1 (that is the home position), and thereby render the machine non-responsive to ringing current when insufficient recording time is available on the magnetic tape in the main recorder unit 3 to enable a subscriber to have a certain minimum time period in which to record his message. The operation of this switch will be described with reference to Figure 5.

Figure 2 shows a circuit diagram of the amplifier portion of the unit 2. In this figure, valves V2 and V3A function as amplifiers, valve V3B also acts as an amplifier when a message is being recorded on the endless tape, and as a cathode follower when the unit 2 is connected to the line or for "playback" purposes valve V4 functions as the erase and bias oscillator. Switches S2F to S2J represent other portions of the system switch, referred to previously in connection with Figure 1, and switch the circuits of the unit 2 according to the function required, i. e. "record," "playback" or connection to the telephone line. The endless tape is also shown diagrammatically at E in association with the tape-actuated contact S4. The output of the amplifier is connected to the record-reproduce head H1 and the output of V4 is connected to the erase-bias head H2. A microphone is connected to the input of V2 for recording a message on the endless tape and if desired this microphone can be used as an earphone to monitor the recorded message in the "playback" position.

Figure 3 is a circuit diagram of the amplifier portion of the main recorder and amplifier unit 3 (the recorder unit itself being shown in Figure 5). The amplifier comprises amplifying stages V5, V6 and V7A, an automatic gain control stage V7B, and an erase-bias oscillator V8 which feeds the erase-bias head H4 in Figure 5. For recording, the input fed from the telephone line is applied to the grid of V5 and the amplified signal is fed from the anode of V7A to the record-reproduce head H3 in Figure 5. For reproducing messages recorded on the tape, the output from head H3 is connected to the grid of V5. Also for reproduction, valve V8 is used as an audio output stage and is fed from V7A through switch S9 which is then closed. The output of valve V8 is fed to a loudspeaker or phones.

Figure 4 shows a circuit diagram of the line monitor circuit 4. The input terminal A of the line monitor circuit to which the telephone line is connected, is joined through a high-pass filter enclosed with the broken-line rectangle F1 to the grid of a triode amplifier valve V9A. The filter circuit F1 comprises two T-section filters connected in series to form the speech-frequency filter which substantially cuts off below 300 C./S. The signals amplified by valve V9A are fed through amplifier valves V9B and V10 to the cathode of the diode rectifier V11. The rectified output from valve V11 is fed to condenser C5 connected across the grid of valve V12 to provide a negative bias on the grid of valve V12. The anode of valve V12 is connected through the relay coil C'/4 to the positive high tension supply line H. T. 2.

Input terminal A is also connected through a resistor R8 and clipping rectifiers W1 and W2 to a low-pass filter enclosed within the broken-line rectangle F2. The filter F2 is designed to pass dialling tone frequencies and certain harmonics thereof and the output of this filter is applied to the grid of a triode amplifier valve V13. The output from valve V13 is applied to the anode of rectifier V14 and the output from this rectifier is fed to the grid of valve V15. The cathode of valve V15 is connected to a tapping point on resistor R10 forming part of a resistor chain comprising resistors R9 and R10 connected across the high tension supply H. T. 1. Thus a positive bias is applied to the cathode of valve V15 which is thereby normally cut-off. The anode of valve V15 is connected in parallel with the anode of valve V12 through the relay coil C'/4 to the positive high tension supply line H. T. 2. A bias derived from condenser C4 in Figure 1 is applied from the terminal B2 to the grid of valve V15.

The anode of valve V9A is also connected through condenser C6 to rectifier W3 which produces a rectified negative voltage from the signal at the anode of V9A across condenser C7 and this is applied to the grid of valve V13 through resistor R11. The high tension supply H. T. 1 feeds valves V9A, V9B, V10 and V13 and the high tension supply H. T. 2 feeds valves V12 and V15.

The operation of the circuit will now be explained. Towards the end of the reproduction of the message on the endless tape E to the caller, the line monitor circuit is connected to the telephone lines and the words "Please speak now" are applied to terminal A. The rectified signal thus obtained at the anode of valve V11 charges condenser C5 negatively and this voltage is applied to the grid of valve V12 so that the valve remains cut-off in order to prevent coil C'/4 being energised as soon as H. T. is applied to valves V12 and V15. As mentioned previously valve V15 is normally cut-off by the cathode bias provided from resistor R10 and therefore no current will pass through the coil of relay C'/4 which remains inoperative.

If after a delay produced by the discharge time constant of condenser C5 and resistors R12 and R13 the caller has not commenced to dictate a message, the bias on valve V12 is removed, which would conduct and thus energise the coil of relay C'/4 to switch off the telephone answering machine. The delay provided by the discharge of C5 allows a reasonable period e. g., 5 seconds for the caller to hesitate before dictating his message.

Since speech voltages from the unit 2 are used to hold off the operation of relay C'/4 for a short period until the caller begins to speak, the absence of such signals due for example to a fault in the answering unit, can be used to render the machine inoperative until such a fault is cleared, as previously explained.

In addition, when H. T. is applied to valves V12 and V15 a negative voltage from C4 (Figure 1) is applied to the grid of valve V15 through terminal B2 for a few seconds in order to prevent the valve from conducting on spurious signals produced by switching operations in the machine. Assuming however that the caller dictates a message when invited to do so, the speech signals fed through filter F1 and amplifiers V9A, V9B and V10 and detected by valve V11, will maintain the negative charge across condenser C5 so that valve V12 remains cut-off and relay C'/4 inoperative. When the caller replaces his telephone receiver, the negative voltage at the grid of valve V12 decreases due to the discharge of condenser C5, hence this valve conducts and relay C'/4 operates to switch off the telephone answering machine as previously explained. This is the operation of the machine when connected to a manual exchange or on the termination of a trunk call when after the caller has replaced his receiver the links between the exchanges involved may not be immediately broken and no dialling tone is received.

Whilst the caller is speaking, a portion of the speech signal appearing at the anode of valve V9A is rectified by the rectifier W3 to produce a negative voltage across condenser C7 which is applied as a bias to the grid of valve V13 through resistor R11 to ensure that V13 is cut-off. This bias is necessary since it is not possible completely to separate the dialling tone harmonics from speech frequencies and hence a certain amount of speech current passes through rectifiers W1 and W2 and the low pass filter F2 to the grid of valve V13 and may be sufficient in the case of very strong speech signals, when amplified by valve V13 and rectified by valve V14 to overcome the bias of valve V15 causing the latter valve to conduct and so energise relay coil C'/4, thus switching off the telephone answering machine and cutting off the caller while he is speaking.

On automatic exchanges when the caller hangs up his receiver, dialling tone is fed through low pass filter F2 to the grid of valve V13. This valve can now amplify the dialling tone since the bias produced across condenser C7 has been removed with the termination of the speech signals. The amplified signal from valve V13 is rectified by valve V14 and overcomes the positive cathode bias of valve V15 causing this valve to conduct and thereby energise the coil of relay C'/4 which operates to switch off the telephone answering machine.

Figure 5 shows part of the magnetic tape recorder forming the recording device in the unit 3, and on which a caller's message is recorded. It comprises a tape feed spool 11 and take-up spool 12, between which travels the magnetic recording tape 19. The tape 19 passes over guide posts 20 and past the erase head H4 and recording head H3 in its travel between the feed spool 11 and take-up spool 12 as the caller's message is being recorded.

In order to allow a caller a minimum recording time a feeler member 13, pivotally mounted at 14 is arranged to engage the tape on the feed spool 11 and is urged inwardly towards the centre of the spool 1 by a spring 15, as the tape is unwound therefrom. The rear end 13a of the feeler member 13 carries a contact 16 which can engage an adjustable contact 17 mounted on the tape deck. These two contacts together form the tape operated switch S7. The contact 17 is adjusted and the arrangement and shape of the feeler 13 is such that the contact 16 engages the contact 17 when the amount of tape on the feed spool 1 reaches the minimum necessary to allow a caller the desired recording time. This position is indicated at X in broken lines.

When the feeler 13 reaches position X and contacts 16 and 17 are closed, a circuit is completed across the relay coil C/4 through switch S2C so that it is short-circuited and cannot set the machine in operation to answer any further calls.

However, if a caller is already connected to the machine and dictating a message or about to dictate a message when the point on the disc of tape is reached at which the switch contacts 16 and 17 are closed, the recording device will continue to record the message received from that caller since the contacts 16 and 17 do not break the speech current circuit, but when the caller finishes his message and rings off, or when the machine switches off and returns to its listening position at the end of the alloted time period, it will not respond to any further incoming calls since the relay C/4 initiating the operation of the machine can no longer be energised.

As the relay C/4 is also employed at other times during the operation of the machine, the switch contacts 16 and 17 which short circuit its operating coil are connected in series with the second switch S2C which is not closed to complete the short circuit across the relay coil while the machine is connected to a caller but which is closed upon termination of a call when the machine returns to its listening position. This arrangement allows the relay C/4 to function normally at all times until the call is terminated.

The follower 13 may be held out of engagement with the spool 11 in the position indicated in broken lines at Y by means of the stop 18, in order to facilitate removal and replacement of the spool on the tape deck. The follower can be released from position Y by disengaging the stop 18 which can take the form of a push-button.

Whilst a particular embodiment has been described, it will be understood that various modifications may be made without departing from the scope of this invention. For example, if desired the line monitor circuit can be biased in position 4 of S2, when the machine is answering a caller, by means of a voltage derived from a source such as the A. C. mains supply, instead of by part of the output speech from the record-playback unit 2. Furthermore although specifically described as applied to a telephone answering machine, the switching arrangement according to the invention may be employed for any other purpose where it is desired to control a sequence of operations.

I claim:

1. A telephone answering machine, comprising means for answering a telephone automatically, means for reproducing a recorded message to a caller and for inviting the caller to record a message, a recording device for recording the caller's message, an electrically operated stepping switch having a plurality of switching positions and controlling the sequence of operations performed by the machine, means for operating said switch on the completion of one of the operations to step said switch to another position in which it conditions a circuit associated with the next operation of the sequence, and a delay circuit operative on at least one of the positions of the stepping switch which actuates the stepping switch after a predetermined time delay to switch the machine to the next position if the stepping switch has not already been actuated on completion of the operation in said at least one position, said delay circuit comprising an electronic valve and at least one resistor and condenser network having a time constant producing the desired delay period.

2. A machine as claimed in claim 1, comprising relay means for operating said stepping switch connected to said valve and means controlled by said at least one resistor and condenser network for rendering said valve conducting to energise said relay means.

3. Switching arrangement for controlling a sequence of operations comprising an electrically-operated stepping switch having a plurality of switching positions and controlling the sequence of operations, means for operating said switch on the completion of one of the operations to step said switch to another position in which it conditions a circuit associated with the next operation of the sequence, a delay circuit operative on a plurality of the positions of the stepping switch which actuates the stepping switch after a predetermined time delay to switch the machine to the next position if the stepping switch has not already been actuated on completion of an operation in any one of said plurality of positions and contacts on said stepping switch which operate to adjust the time period of the delay circuit in the different positions of the stepping switch in which the delay circuit is operative.

4. A machine as claimed in claim 1, in which the delay circuit includes plural time constant networks respectively operative on a plurality of the positions of the stepping switch, and contacts are provided on said stepping switch which operate to selectively switch into operation the different time constant networks to adjust the delay period in the different positions of the stepping switch in which the delay circuit is operative.

5. A machine as claimed in claim 1, in which the delay circuit includes a time constant network which is operative after a predetermined time delay to return the stepping switch to its starting position after the completion of the final operation of the sequence.

6. A switching arrangement for controlling a sequence of operations comprising an electrically operated stepping switch having a plurality of switching positions and controlling the sequence of operations, means for operating said switch on the completion of one of the operations to step said switch to another position in which it conditions a circuit associated with the next operation of the sequence and a delay circuit operative on at least one of the positions of the stepping switch which actuates the stepping switch after a predetermined time delay to the next switch position if the stepping switch has not already been actuated on completion of the operation in said at least one position, said delay circuit comprising an electronic valve in combination with at least one time constant network producing the desired delay period.

7. An arrangement as claimed in claim 6, comprising relay means for operating said stepping switch connected to said valve, and means controlled by said at least one time constant network for rendering said valve conducting to energise said relay means.

8. An arrangement as claimed in claim 6, in which the delay circuit includes plural time constant networks respectively operative on a plurality of the positions of the stepping switch, and contacts are provided on said stepping switch which operate to selectively switch into operation different time constant networks to adjust the time period of the delay period in the different positions of the stepping switch in which the delay circuit is operative.

9. An arrangement as claimed in claim 6, in which the delay circuit includes a time constant network which is operative after a predetermined time delay to return the stepping switch to its starting position after the completion of the final operation of the sequence.

References Cited in the file of this patent

UNITED STATES PATENTS

| | | |
|---|---|---|
| 2,039,015 | Matthies | Apr. 28, 1936 |
| 2,673,241 | Van Deventer | Mar. 23, 1954 |
| 2,761,899 | Keith et al. | Sept. 4, 1956 |